United States Patent
Cai et al.

(10) Patent No.: US 11,031,789 B2
(45) Date of Patent: Jun. 8, 2021

(54) BATTERY PACK MANAGEMENT SYSTEM AND CONTROL METHOD THEREOF

(71) Applicant: Contemporary Amperex Technology Co., Limited, Ningde (CN)

(72) Inventors: Fupeng Cai, Ningde (CN); Fuming Ye, Ningde (CN); Qiandeng Li, Ningde (CN); Changjian Liu, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 245 days.

(21) Appl. No.: 16/382,778

(22) Filed: Apr. 12, 2019

(65) Prior Publication Data
US 2020/0006955 A1    Jan. 2, 2020

(30) Foreign Application Priority Data

Jun. 28, 2018 (CN) .......................... 201810687816.4

(51) Int. Cl.
*H02J 7/00* (2006.01)
*H01M 10/42* (2006.01)
(Continued)

(52) U.S. Cl.
CPC ....... *H02J 7/0013* (2013.01); *H01M 10/4257* (2013.01); *H01M 10/4264* (2013.01);
(Continued)

(58) Field of Classification Search
CPC .... H02J 7/0013; H01M 50/572; H01M 50/20; H01M 10/4257; H01M 10/4264; H01M 10/441; H01M 2010/4271
(Continued)

(56) References Cited

U.S. PATENT DOCUMENTS 5,498,950 A * 3/1996 Ouwerkerk ............. B60L 58/21
320/119
10,700,388 B2 * 6/2020 Sun ................... H01M 10/4257
(Continued)

FOREIGN PATENT DOCUMENTS

CN         103176939 A     6/2013
CN         205484533 U     8/2016
(Continued)

OTHER PUBLICATIONS

The First Official Action and search report dated May 11, 2020 for Chinese application No. 201810687816.4, 8 pages.
(Continued)

*Primary Examiner* — Suresh Memula
(74) *Attorney, Agent, or Firm* — Law Offices of Liaoteng Wang

(57) ABSTRACT

A battery pack management system includes a controller, an isolation unit, a plurality of battery pack management units, and a plurality of battery packs. The plurality of battery pack management units are connected in series by a first daisy chain, and the plurality of battery pack management units are also connected in series by a second daisy chain. The first daisy chain transmits sampled data that is collected by the battery pack management units from corresponding battery packs and transmits control instructions of the controller. The second daisy chain transmits a failure prompt signal which is generated by a battery pack management unit that detects a failure. A first battery pack management unit and a last battery pack management unit of the plurality of battery pack management units connected in series are connected to the controller through the isolation unit.

8 Claims, 3 Drawing Sheets

(51) Int. Cl.
  *H01M 10/44* (2006.01)
  *H01M 50/20* (2021.01)
  *H01M 50/572* (2021.01)

(52) U.S. Cl.
  CPC ......... *H01M 10/441* (2013.01); *H01M 50/20* (2021.01); *H01M 50/572* (2021.01); *H01M 2010/4271* (2013.01)

(58) Field of Classification Search
  USPC .......................................................... 320/137
  See application file for complete search history.

(56) References Cited

U.S. PATENT DOCUMENTS

| | | | |
|---|---|---|---|
| 2003/0160593 A1* | 8/2003 | Yau | H02J 7/0018 320/116 |
| 2010/0259221 A1* | 10/2010 | Tabatowski-Bush | B60L 58/18 320/134 |
| 2011/0300415 A1* | 12/2011 | Kumagai | B60L 58/18 429/7 |
| 2012/0223677 A1* | 9/2012 | Yamauchi | H02J 7/0014 320/116 |
| 2013/0234667 A1* | 9/2013 | Norton | H01M 10/441 320/122 |
| 2013/0307478 A1* | 11/2013 | Boggs | H02J 7/0042 320/112 |
| 2014/0091751 A1* | 4/2014 | Workman | H02J 7/0024 320/106 |
| 2014/0152261 A1* | 6/2014 | Yamauchi | G01R 31/396 320/118 |
| 2014/0320065 A1* | 10/2014 | Sahu | H02J 7/0019 320/107 |
| 2016/0164318 A1* | 6/2016 | Sekizaki | H02J 7/0021 320/118 |
| 2018/0102581 A1* | 4/2018 | Jayaraman | H03G 3/3042 |
| 2018/0309171 A1* | 10/2018 | Qin | H01M 10/4207 |
| 2019/0128970 A1* | 5/2019 | Taya | G01R 31/371 |
| 2019/0356143 A1* | 11/2019 | Lee | G01R 31/3835 |
| 2019/0361075 A1* | 11/2019 | Lee | H01M 10/4207 |
| 2021/0018567 A1* | 1/2021 | Horiguchi | G01R 31/389 |

FOREIGN PATENT DOCUMENTS

| | | |
|---|---|---|
| CN | 206540956 U | 10/2017 |
| CN | 107770025 A | 3/2018 |
| EP | 2693597 A1 | 2/2014 |
| EP | 2899556 A1 | 7/2015 |

OTHER PUBLICATIONS

The extended European search report dated Sep. 10, 2019 for European Application No. 19161111.0, 6 pages.

* cited by examiner

BATTERY PACK MANAGEMENT SYSTEM AND CONTROL METHOD THEREOF

CROSS-REFERENCE TO RELATED APPLICATION

This application is based upon and claims priority to Chinese Patent Application No. 201810687816.4, filed on Jun. 28, 2018, the content of which is incorporated herein by reference in its entirety.

FIELD

The present disclosure relates to the field of batteries, and particularly to a battery pack management system and a control method thereof.

BACKGROUND

With widespread application of new energy, batteries may be used as power sources in various fields. In order to ensure working safety of the batteries, it is necessary to collect and monitor performance data of the batteries.

In practical applications, the batteries often include a plurality of battery packs. Due to individual differences of the plurality of battery packs, the performance data of each battery pack may also be different in actual work scenarios. Moreover, when one or more of the plurality of battery packs fail, the performance data of the failed battery pack is different from that of a normal battery pack. A battery management unit may identify the failed battery pack and adjust the control of the battery packs according to the performance data of the battery packs.

However, the battery management unit needs to check the transmitted performance data of the battery packs one by one. When abnormal performance data of a certain battery pack or a certain plurality of battery packs is found, it may be determined that the battery management unit or the battery pack(s) is abnormal. That is to say, it takes a long time for the battery management unit to find the abnormalities in the battery management unit or the battery pack(s), so its timeliness is poor.

SUMMARY

The embodiments of the present disclosure provide a battery pack management system and a control method thereof.

In a first aspect, the embodiments of the present disclosure provide a battery pack management system including a controller, an isolation unit, a plurality of battery pack management units, and a plurality of battery packs. The plurality of battery pack management units are connected in series by a first daisy chain, and the plurality of battery pack management units are also connected in series by a second daisy chain. Each of the battery pack management units is used to manage a corresponding battery pack. The first daisy chain is used to transmit sampled data which is collected by the battery pack management unit from the corresponding battery pack and transmit control instructions of the controller. The second daisy chain is used to transmit a failure prompt signal generated by a battery pack management unit that detects a failure. A first battery pack management unit of the plurality of battery pack management units connected in series and a last battery pack management unit of the plurality of battery pack management units connected in series are connected to the controller through the isolation unit.

In a second aspect, the embodiments of the present disclosure provide a control method of a battery pack management system, which is applied to the battery pack management system in the above technical solution. The control method of the battery pack management system includes: detecting by the controller whether a failure prompt signal transmitted through the second daisy chain is received; determining, when the failure prompt signal transmitted through the second daisy chain is received, by the controller that the battery pack management system fails.

BRIEF DESCRIPTION OF THE DRAWINGS

The present disclosure can be better understood from the following description of the Detailed Description of the present disclosure with reference to the attached drawings, where the same or similar reference numbers represent the same or similar features.

DETAILED DESCRIPTION

Figure 1:
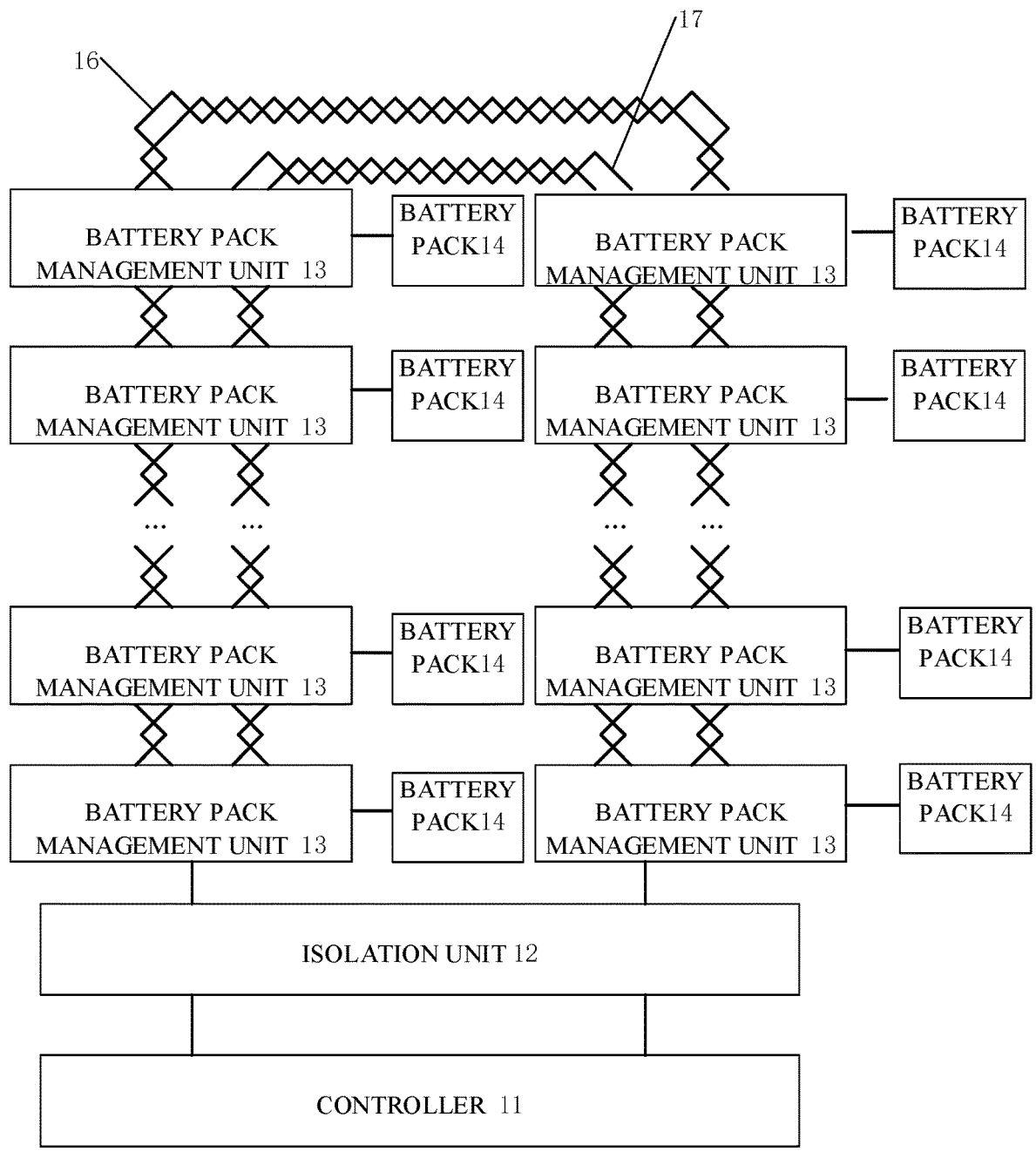
FIG. 1 is a schematic structural diagram of a battery pack management system according to an embodiment of the present disclosure.

Various aspects of features and exemplary embodiments of the present disclosure will be described in detail below. A number of specific details are presented in the following detailed description to provide a comprehensive understanding of the present disclosure. However, it will be apparent to those skilled in the art that the present disclosure may be practiced without some of these specific details. The following description of the embodiments is merely to provide a better understanding of the present disclosure by illustrating examples thereof. The present disclosure is by no means limited to any specific configuration and algorithm set forth below, but covers any modification, replacement and improvement of elements, components and algorithms without departing from the spirit of the present disclosure. Well-known structures and techniques are not shown in the drawings and the following description, so as to avoid unnecessary ambiguity of the present disclosure.

The embodiments of the present disclosure provide a battery pack management system and a control method thereof, which may be applied in scenarios where a battery pack management unit (BMU) manages a plurality of battery packs. Each of the battery packs corresponds to a battery pack management unit. A plurality of battery pack management units may be connected in series by a daisy chain(s), and the battery pack management units at the first and at the end of the plurality of battery pack management units connected in series by the daisy chain(s) may be connected to a controller in the BMU through an isolation unit. The controller may be specified as a Microcontroller Unit (MCU). The battery pack management units may sample relevant data of the battery packs. The relevant data may include voltage, current, temperature, charge state etc., and is not limited herein. The BMU may also send control instructions, such as equalization control instructions, to each of the battery pack management units through the daisy chain(s). The battery pack management units may manage the corresponding battery packs according to the control instructions.

FIG. 1 is a schematic structural diagram of a battery pack management system according to an embodiment of the present disclosure. As shown in FIG. 1, the battery pack management system includes a controller 11, an isolation unit 12, a plurality of battery pack management units 13, and a plurality of battery packs 14. The plurality of battery packs in the battery pack management system may be connected in series, in parallel, or both in series and parallel, which is not limited herein.

Each of the battery pack management units 13 may be used to manage a corresponding battery pack 14. For example, the battery pack management unit 13 may be used to collect voltage, current, temperature, charge state, and other related parameters of the corresponding battery pack 14. The relevant parameters collected are sampled data. The battery pack management unit may also detect whether a communication failure of the battery pack management unit itself occurs, and detect whether the battery pack fails according to the sampled data, for example, abnormal battery pack voltage, abnormal battery pack temperature and other failures. The battery pack management unit 13 may be further used to receive a control instruction of the controller 11 and manage the battery pack 14 according to the control instruction.

The first battery pack management unit 13 of the plurality of battery pack management units 13 connected in series and the last battery pack management unit 13 of the plurality of battery pack management units 13 connected in series are connected to the controller 11 through the isolation unit 12. That is to say, the two battery pack management units 13 at the first and at the end of the plurality of battery pack management units 13 connected by a first daisy chain 16 and a second daisy chain 17 are connected to the controller 11 through the isolation unit 12, so as to form a circular communication loop of the plurality of battery pack management units 13.

The isolation unit 12 may be used to isolate high voltage and low voltage of the battery pack management units 13 and the controller 11, so as to prevent the voltage of the battery pack management units 13 and the battery packs 14 from harming the controller 11.

The plurality of battery pack management units 13 are connected in series by the first daisy chain 16, and the plurality of battery pack management units 13 are also connected in series by the second daisy chain 17. That is to say, the plurality of battery pack management units 13 communicate through the two daisy chains.

The first daisy chain 16 may be used to transmit the sampled data collected by the battery pack management units 13 from the corresponding battery packs 14, and transmit the control instructions of the controller 11. For example, as shown in FIG. 1, the first battery pack management unit 13 at the lower left is the battery pack management unit 13 at the first, and the first battery pack management unit 13 at the lower right is the battery pack management unit 13 at the end. The controller 11 may generate the control instructions and send the control instructions to the battery pack management unit 13 at the first through the isolation unit 12. The battery pack management unit 13 at the first sequentially transmits the control instructions to other battery pack management units 13 through the first daisy chain 16. Similarly, the sampled data collected by each of the battery pack management units 13 from the corresponding battery pack 14 is sequentially transmitted to the controller 11 through the first daisy chain 16 and the isolation unit 12.

The second daisy chain 17 may be used to transmit a failure prompt signal. The failure prompt signal may be generated by the battery pack management unit 13 that detects a failure. After the failure prompt signal is generated, the failure prompt signal is sent, starting from the battery pack management unit 13 that detects the failure, successively pass through the subsequent battery pack management units 13 to achieve the transmission in the second daisy chain 17, and is transmitted to the controller 11 through the second daisy chain 17 and the isolation unit 12. It makes the controller 11 receive the failure prompt signal quickly, so as to quickly determine that a failure of the battery pack management system occurs.

In the embodiments of the present disclosure, the plurality of battery pack management units 13 are connected in series by the first daisy chain 16 and the second daisy chain 17. The battery pack management units 13 at the first and at the end of the plurality of battery pack management units 13 are connected to the controller 11 through the isolation unit 12, so as to form a circular communication loop of the battery pack management system. The first daisy chain 16 transmits the sampled data and the control instructions. When the battery pack management unit 13 in the battery pack management system detects a failure, the battery pack management unit 13 that detects the failure generates a failure prompt signal and transmits the failure prompt signal through the second daisy chain 17. The battery pack management unit 13 may detect a communication failure such as communication interruption. The battery pack management unit may also detect a performance failure such as abnormal voltage and abnormal temperature of the battery pack.

In the prior art, if the controller 11 wants to find abnormalities of the battery pack management system, it is necessary to set a detection period to periodically perform failure detection on the battery pack management units 13 in the battery pack management system. For example, the detection period is 5 minutes. The controller 11 may perform failure detection on the battery pack management unit every 5 minutes. However, it may occur that a failure has occurred, but there is still a certain time period from the trigger time of failure detection. Then, there is a delay for the battery pack management system to find the failure. Or, the controller 11 may collect the sampled data and determines whether the battery pack management system fails by processing the sampled data. However, it takes a certain period of time to process the sampled data, thereby causing a delay for the battery pack management system to find the failure.

Compared with the above prior art, in the embodiment of the present disclosure, the battery pack management unit 13 that detected the failure may generate a failure prompt signal in real time, and the failure prompt signal may be quickly transmitted to the controller 11 through the second daisy chain 17 in real time. Therefore, the battery pack management system may quickly and timely find abnormalities of the battery pack management system (including various types of failures), and improve the safety and reliability of the battery pack management system.

Moreover, in the embodiments of the present disclosure, high voltage isolated communication can be achieved only by disposing the isolation unit 12 between the battery pack management unit 13 at the first and the controller 11, and between the battery pack management unit 13 at the end and the controller 11. It is not necessary to configure the isolation unit 12 and the controller 11 for each of the battery pack management units 13, or to configure an isolated power supply additionally. As a result, the structure of the battery pack management system can be simplified and the cost of the battery pack management system can be reduced. The battery pack management system in the embodiments of the present disclosure is especially suitable for scenarios with a large number of communication nodes.

In some examples, capacitors may be disposed separately between the first daisy chain 16 connecting two adjacent battery pack management units 13 and the two adjacent battery pack management units 13. That is to say, in the transmission of the sampled data or the control instructions from one battery pack management unit A1 to another adjacent battery pack management unit A2, the sampled data or the control instructions may be sent, starting from the battery pack management unit A1, sequentially pass through the capacitor between the battery pack management unit A1 and the first daisy chain 16, the first daisy chain 16, the capacitor between the first daisy chain 16 and the battery pack management unit A2, and may reach the battery pack management unit A2. The size and number of the capacitors may be selected according to the work scenario and work requirements, which is not limited herein.

Disposition of the capacitors may effectively achieve isolation between high voltages in communication based on the first daisy chain 16. Moreover, the disposed capacitors may also indirectly reduce the voltage between a high voltage side and a low voltage side, and help to achieve isolation between the high voltage and the low voltage, thereby further improving the safety and reliability of the battery back management system.

In some examples, capacitors may be disposed separately between the second daisy chain 17 connecting two adjacent battery pack management units 13 and the two adjacent battery pack management units 13. That is to say, in the transmission of the failure prompt signal from one battery pack management unit A1 to another adjacent battery pack management unit A2, the failure prompt signal may be transmitted, starting from the battery pack management unit A1, sequentially pass through the capacitor between the battery pack management unit A1 and the second daisy chain 17, the second daisy chain 17, the capacitor between the second daisy chain 17 and the battery pack management unit A2, and may reach the battery pack management unit A2.

Disposition of the capacitors may effectively achieve isolation between high voltages in the communication based on the second daisy chain 17. Moreover, the disposed capacitors may also indirectly reduce the voltage between the high voltage side and the low voltage side, and help to achieve isolation between the high voltage and the low voltage, thereby further improving the safety of the battery pack management system. Moreover, the disposed capacitors may also improve the anti-interference ability of communication transmission of the first daisy chain 16 and the second daisy chain 17. At the same time, the transmission rates of the first daisy chain 16 and the second daisy chain 17 may be custom-configured to meet various performance requirements of the battery pack management system.

It should be noted that the capacitors between the two adjacent battery pack management units 13 and the first daisy chain 16 of the two adjacent battery pack management units 13 may be separately disposed. Alternatively, the capacitors between two adjacent battery pack management units 13 and the second daisy chain 17 of the two adjacent battery pack management units 13 may be separately disposed. Alternatively, both of the capacitors between two adjacent battery pack management units 13 and the first daisy chain 16 of the two adjacent battery pack management units 13, and the capacitors between two adjacent battery pack management units 13 and the second daisy chain 17 of the two adjacent battery pack management units 13 may be simultaneously disposed. This is not limited herein.

In some examples, the isolation unit 12 in the above embodiments may include a first isolation unit 121 and a second isolation unit 122.

The first battery pack management unit 13 of the plurality of battery pack management units 13 connected in series may be connected to the controller 11 through the first isolation unit 121. The last battery pack management unit 13 of the plurality of battery pack management units 13 connected in series may be connected to the controller 11 through the second isolation unit 122.

Figure 2:
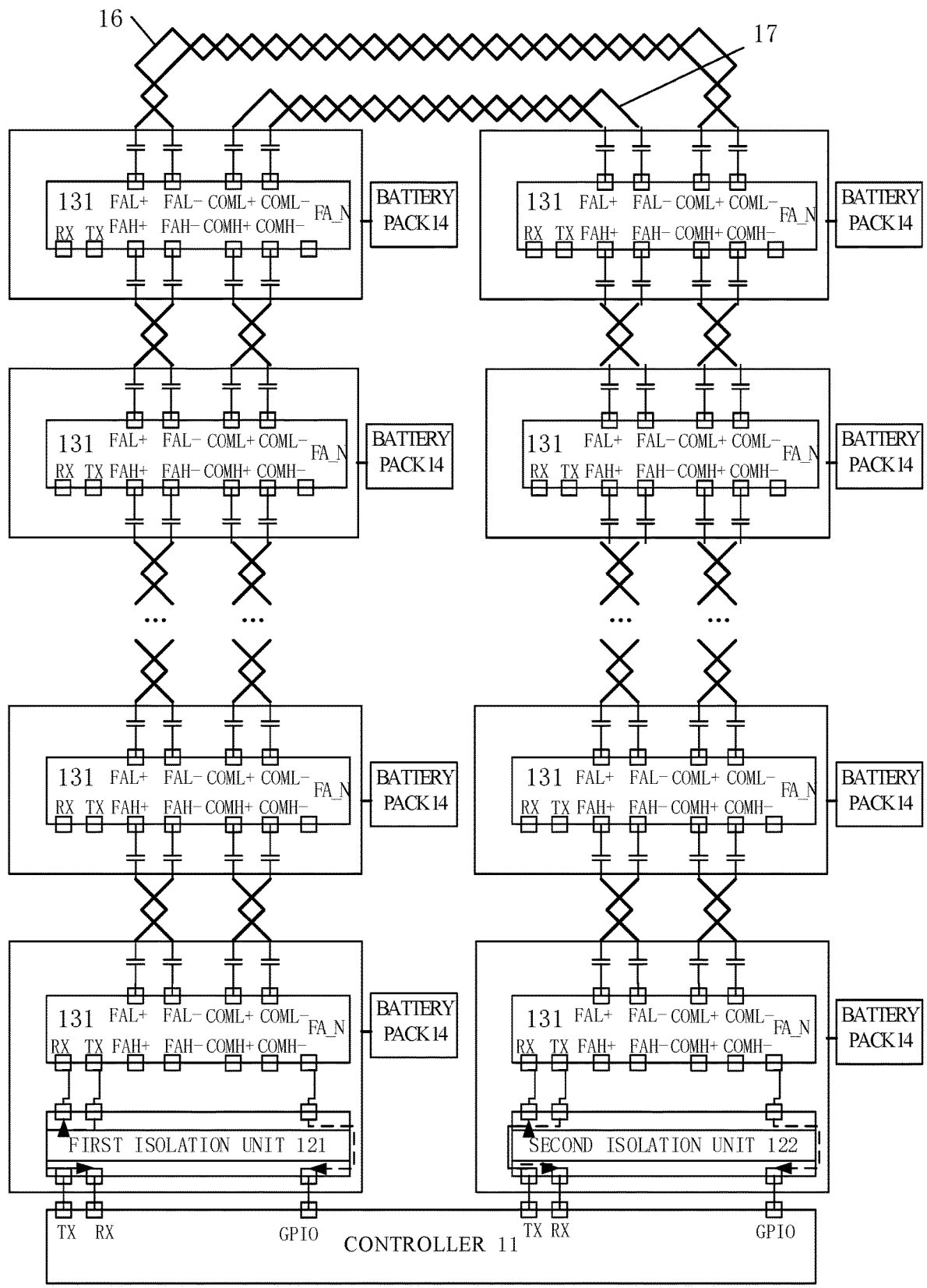
FIG. 2 is a schematic structural diagram of a specific implementation of a battery pack management system according to an embodiment of the present disclosure.

FIG. 2 is a schematic structural diagram of a specific implementation of a battery pack management system according to an embodiment of the present disclosure. As shown in FIG. 2, the battery pack management unit 13 includes a battery management chip 131. The battery management chip 131 may specifically be chip BQ76PL455 and other chips, which is not limited herein.

Communication pins of the battery management chips 131 may be connected to form the first daisy chain 16, so that the plurality of battery management chips 131 are connected in series. As shown in FIG. 2, the communication pins of the battery management chips 131 may include COML+, COML−, COMH+, and COMH−. Pins COML+ and COML− of the previous battery management chip 131 may be connected to pins COMH+ and COMH− of the next battery management chip 131. The battery management chip 131 at the first may be connected to the first isolation unit 121 through a reception pin Rx, a transmission pin Tx, a failure output pin FA_N, and a wake-up pin WAKEUP.

Failure pins of all the battery management chips 131 may be connected to form the second daisy chain 17, so that the plurality of battery management chips 131 are connected in series. As shown in FIG. 2, the failure pins of the battery management chips 131 may include FAL+, FAL−, FAH+, and FAH−. Pins FAL+ and FAL− of the previous battery management chip 131 may be connected to pins FAH+ and FAH− of the next battery management chip 131. The battery management chip 131 at the end may be connected to the second isolation unit 122 through the reception pin Rx, the transmission pin Tx, and the failure output pin FA_N. If the battery management chip 131 fails or the battery pack monitored by the battery management chip 131 fails, the battery management chip 131 may generate a pulse signal, which is the failure prompt signal.

In some examples, the controller 11 may be provided with a first serial port and a second serial port.

The controller 11 may be connected to the isolation unit 12 through the first serial port. The first serial port may be used to send the control instructions to the battery pack management units 13 through the isolation unit 12. The first serial port may also be used to receive the sampled data transmitted from the battery pack management unit through the isolation unit 12. For example, as shown in FIG. 2, the first serial port on the controller 11 for connecting to the first isolation unit 121 may include a reception pin Rx and a transmission pin Tx. The controller 11 may transmit the control instructions using the transmission pin Tx. The controller 11 may receive the sampled data through the reception pin Rx.

The controller 11 may be connected to the isolation unit 12 through a second serial port. The second serial port may be used to receive the control instructions and/or the sampled data transmitted from the battery pack management units 13 through the isolation unit 12. For example, as shown in FIG. 2, the second serial port on the controller 11 for connecting to the second isolation unit 122 may include a reception pin Rx and a transmission pin Tx. The controller 11 may use the reception pin Rx of the second serial port to receive the sampled data and/or the control instructions.

The controller 11 may transmit the control instructions through the first serial port. Or reception of the control instructions by the second serial port may indicates that the control instructions can reach each of the battery pack management units 13. The controller 11 may receive the sampled data through the first serial port. The controller 11 may also receive the sampled data through the second serial port. If the second serial port may receive the sampled data corresponding to all of the battery pack management units 13, it is indicated that the circular communication loop formed by the first daisy chain 16, the battery pack management units 13, the isolation unit 12, and the controller 11 works normally. The sampled data corresponding to each of the battery pack management units 13 can reach the controller 11. Moreover, the second serial port may also perform information verification on the sampled data received by the first serial port and the sampled data received by the second serial port, and perform information verification on the control instructions sent by the first serial port and the control instructions received by the second serial port, so as to further verify the accuracy of the communication.

The battery pack management system may fail during operation of the battery pack management system. Specifically, a communication failure may occur in the battery pack management system. For example, a single-point communication failure occurs in the first daisy chain. That is to say, a node in the circular communication loop formed by the battery pack management system is dropped, which may lead to communication interruption of the first daisy chain 16. Or, one of the two serial ports of the controller 11 may fail. The controller 11 may take a series of measures for possible failures of the battery pack management system. The details will be described below.

In the above embodiments, the controller 11 may be used to, in the case of a single-point communication failure of the first daisy chain, configure the first serial port to send the control instructions to the battery pack management units 13 through the isolation unit 12 and to receive the sampled data transmitted from the battery pack management units 13 through the isolation unit 12, and configure the second serial port to send the control instructions to the battery pack management units 13 through the isolation unit 12 and to receive the sampled data transmitted from the battery pack management units 13 through the isolation unit 12.

A single-point communication failure of the first daisy chain 16 in the battery pack management system is determined, which leads to abnormal communication of the first daisy chain 16. The controller 11 may configure the first serial port and the second serial port respectively.

In the case of no communication failure of the first daisy chain 16, the first serial port may be used to send the control instructions to the battery pack management units 13 through the isolation unit 12. In the case of a single-point communication failure of the first daisy chain 16, the circular communication loop formed by the first daisy chain 16 is broken. The controller 11 may configure the first serial port to receive the sampled data transmitted from the battery pack management units 13 through the isolation unit 12 in addition to sending the control instructions to the battery pack management units 13.

Similarly, in the case of no failure of the first daisy chain 16, the second serial port may be used to receive the control instructions and/or the sampled data transmitted from the battery pack management units 13 through the isolation unit 12. In the case of a communication failure of the first daisy chain 16, the circular communication loop formed by the first daisy chain 16 is broken. The controller 11 may configure the second serial port to send the control instructions to the battery pack management units 13 through the isolation unit 12 in addition to receiving the sampled data transmitted from the battery pack management units 13.

That is to say, in the case of a single-point communication failure of the first daisy chain 16, the controller 11 may configure the first serial port and the second serial port, so that the first daisy chain 16 which originally formed the circular communication loop can be converted into two single-daisy-chains for communication. In this way, the communication interruption of the battery pack management system is avoided, and the reliability of the battery pack management system is improved.

It is worth mentioning that when the battery pack management system is converted into two single-daisy-chains for communication, since it is no longer the circular communication, the two single-daisy-chains may each send the control instructions and receive the sampled data. For either one of the single-daisy-chains, the sampled data or the control instructions of the battery pack management units 13 in one single-daisy-chain cannot be obtained from the other corresponding serial port. Therefore, the two single-daisy-chains no longer perform information verification.

A single-daisy-chain may include the battery pack management unit 13 at the first to the battery pack management unit 13 before the failure point of the first daisy chain 16. The controller 11 may manage the single-daisy-chain through the first serial port. The other single-daisy-chain may include the battery pack management unit 13 at the end to the battery pack management unit 13 after the failure point of the first daisy chain 16. The controller 11 may manage the other single-daisy-chain through the second serial port.

For example, the battery pack management system may include N battery pack management units 13. If a communication failure occurs in the first daisy chain 16 between the M−1th battery pack management unit 13 and the Mth battery pack management unit 13, the Mth battery pack management unit 13 to the Nth battery pack management unit 13 may be not able to receive the control instructions sent by the first serial port. The controller 11 may reconfigure the first and second serial ports, so that the first battery pack management unit 13 to the M−1th battery pack management unit 13 form one single-daisy-chain, and the Mth battery pack management unit 13 to the Nth battery pack management unit 13 form another single-daisy-chain. The communication of the battery pack management system can be maintained. M and N are positive integers, M<N.

It should be noted that the second serial port may not receive control instructions after the first serial port sends the control instructions, which leads to failure of information verification of the second serial port on the control instructions. Or, after the first serial port sends an instruction for requesting sampled data, the first serial port may not receive the sampled data provided by all of the battery pack management units 13, and may only receive the sampled data provided by a part of the battery pack management units 13. A single-point communication failure of the first daisy chain 16 can be determined based on either of the above two situations.

During the operation of the battery pack management system, the first serial port or the second serial port of the controller 11 may also fail. If the first serial port fails, the controller 11 may reconfigure the second serial port, enabling the battery pack management system to continue communicating. Similarly, if the second serial port fails, the controller 11 may reconfigure the first serial port, enabling the battery pack management system to continue communicating.

It should be noted that, if the controller 11 monitors that the first serial port or the second serial port cannot receive the sampled data provided by any one of the battery pack management units 13, it may be determined that the first serial port or the second serial port fails.

In some examples, the controller 11 may be configured to turn off the first serial port when the first serial port fails. That is to say, the controller 11 may control the first serial port to exit the communication link of the battery pack management system. The controller 11 may further be used to configure the second serial port to send the control instructions to the battery pack management units 13 through the isolation unit 12, and configure the second serial port to receive the sampled data transmitted from the battery pack management units 13 through the isolation unit 12. That is to say, in the case of failure of the first serial port, a single-daisy-chain with the second serial port performing the sending and receiving is formed in the battery pack management system. It should be noted that, in this case, the second serial port cannot obtain sampled data and/or control instructions from the first serial port, and therefore, the second serial port may not perform information verification.

In other examples, the controller 11 may be configured to turn off the second serial port when the second serial port fails. That is to say, the controller 11 may control the second serial port to exit the communication link of the battery pack management system. The controller 11 may further be used to configure the first serial port to send control instructions to the battery pack management units 13 through the isolation unit 12, and configure the first serial port to receive sampled data transmitted from the battery pack management units 13 through the isolation unit 12. That is to say, in the case of failure of the second serial port, a single-daisy-chain with the first serial port performing the sending and receiving is formed in the battery pack management system. It should be noted that, in this case, the first serial port cannot obtain sampled data and/or control instructions from the second serial port, and therefore, the first serial port may not perform information verification.

Figure 3:
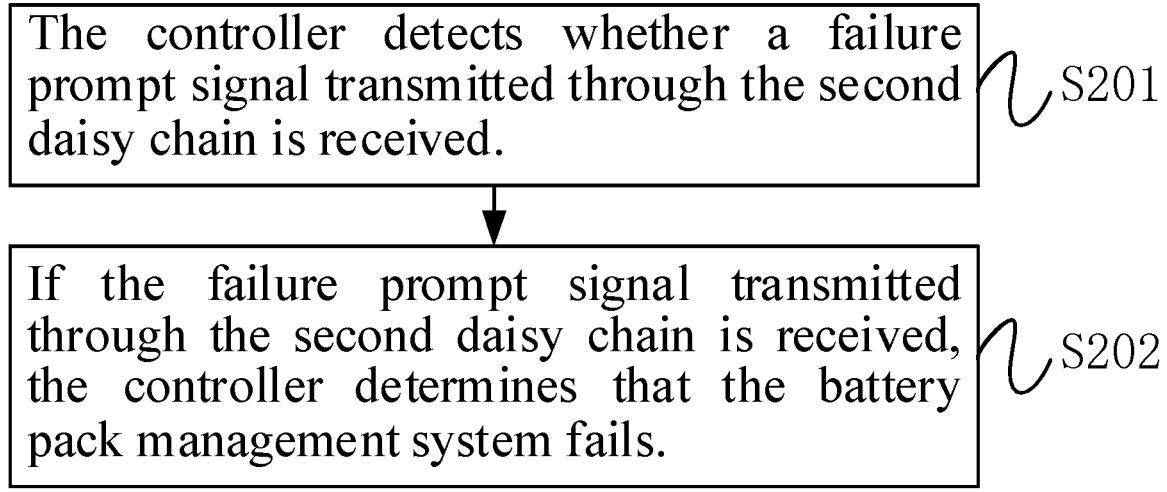
FIG. 3 is a flowchart of a control method of a battery pack management system according to an embodiment of the present disclosure.

FIG. 3 is a flowchart of a control method of a battery pack management system according to an embodiment of the present disclosure. The control method of the battery pack management system may be performed by a controller in the BMU. As shown in FIG. 3, the control method of the battery pack management system includes steps S201 and S202.

In step S201, the controller detects whether a failure prompt signal transmitted through the second daisy chain is received.

In step S202, if the failure prompt signal transmitted through the second daisy chain is received, the controller determines that the battery pack management system fails.

Relevant descriptions of step S201 and the step S202 may be understood with reference to relevant contents of the above embodiments, and will not be repeated herein.

In the embodiments of the present disclosure, when the controller in the battery pack management system receives the failure prompt signal transmitted through the second daisy chain, it may be determined that the battery pack management system fails. Therefore, with the failure prompt signal transmitted through the second daisy chain, abnormalities of the battery pack management system can be found quickly and timely. As a result, the safety and reliability of the battery pack management system can be improved.

It should be noted that the controller may also analyze the sampled data transmitted by the first daisy chain, and determine whether the battery pack management system fails according to the analysis results. The controller may also periodically send detection instructions to the battery pack management units through the first daisy chain, and detect whether the battery pack management unit fails through the detection instructions, so as to determine whether the battery pack management system fails.

When the battery pack management unit(s) in the battery pack management system detects a failure, a failure prompt signal may be generated and transmitted through the second daisy chain. When the controller receives the failure prompt signal, the controller may take measures to avoid damage to the battery pack management system. In some examples, the control method of the battery pack management system described above may further include step S203 and step S204.

In step S203, if a single-point communication failure occurs in the first daisy chain, the controller configures the first serial port to send control instructions to the battery pack management units through the isolation unit, and configures the first serial port to receive sampled data transmitted from the battery group management units through the isolation unit.

In step S204, the controller configures the second serial port to send control instructions to the battery pack management units through the isolation unit, and configures the second serial port to receive sampled data transmitted from the battery pack management units through the isolation unit.

Specifically, relevant descriptions of step S203 and the step S204 may be understood with reference to relevant contents of the above embodiments, and will not be repeated herein.

When the first serial port or the second serial port in the battery pack management system fails, the controller may take measures to avoid communication interruption of the battery pack management system. In some examples, the control method of the battery pack management system described above may further include step S205 or step S206.

In step S205, if the first serial port fails, the controller turns off the first serial port, and configures the second serial port to send control instructions to the battery pack management units through the isolation unit, and configures the second serial port to receive sampled data transmitted from the battery pack management units through the isolation unit.

In step S206, if the second serial port fails, the controller turns off the second serial port, and configures the first serial port to send control instructions to the battery pack management units through the isolation unit, and configures the first serial port to receive sampled data transmitted from the battery pack management units through the isolation unit.

Specifically, relevant descriptions of step S203 and the step S204 may be understood with reference to relevant contents of the above embodiments, and will not be repeated herein.

Those skilled in the art shall appreciate that the foregoing embodiments are illustrative but not limiting. Different technical features appearing in different embodiments can be combined to achieve advantages. Those skilled in the art shall appreciate and implement other variant embodiments of the disclosed embodiments upon reviewing the drawings, the description and the claims. In the claims, the term "comprising" will not preclude another device(s) or step(s); the indefinite article "a/an" will not preclude plural; and the terms "first", "second", etc., are intended to designate a name but not to represent any specific order. Any reference number in the claims shall not be construed as limiting the scope of the present disclosure. Functions of a plurality of parts appearing in a claim can be performed by a separate hardware or software module. Some technical features appearing in different dependent claims will not mean that these technical features cannot be combined to achieve advantages.

It should be clear that the various embodiments in the present specification are described in a progressive manner such that same or similar parts among embodiments may be referred to each other and each embodiment is described focusing on the differences from other embodiments. For method embodiments, relevant parts may be referred to the description of system embodiments. The present disclosure is not limited to the specific steps and structures described above and illustrated in the drawings. A person skilled in the art may make various changes, modifications and additions, or change the order of the steps after understanding the spirit of the present disclosure. Also, for the purpose of concision, the detailed description of known technique is omitted herein.

What is claimed is:

1. A battery pack management system, comprising:
a controller, an isolation unit, a plurality of battery pack management units, and a plurality of battery packs, wherein:
the plurality of battery pack management units are connected in series by a first daisy chain, and the plurality of battery pack management units are also connected in series by a second daisy chain, each of the battery pack management units is used to manage a corresponding battery pack, the first daisy chain is used to transmit sampled data collected by the battery pack management unit from the corresponding battery pack and transmit control instructions of the controller, the second daisy chain is used to transmit a failure prompt signal which is generated by a battery pack management unit that detects a failure;
the isolation unit comprises a first isolation unit and a second isolation unit;
a first battery pack management unit of the plurality of battery pack management units connected in series is connected to the controller through the first isolation unit, and a last battery pack management unit of the plurality of battery pack management units connected in series is connected to the controller through the second isolation unit;
each of the plurality of battery pack management units comprises a battery management chip; and
communication pins of all battery management chips are connected to form the first daisy chain, and failure pins of all the battery management chips are connected to form the second daisy chain.

2. The battery pack management system of claim 1, wherein:
capacitors are disposed respectively between the first daisy chain connecting two adjacent battery pack management units and the two adjacent battery pack management units; and/or
capacitors are disposed respectively between the second daisy chain connecting two adjacent battery pack management units and the two adjacent battery pack management units.

3. The battery pack management system of claim 1, wherein:
the controller is connected to the isolation unit through a first serial port, and the first serial port is used to send control instructions to the battery pack management units through the isolation unit, and receive sampled data transmitted from the battery pack management units through the isolation unit; and
the controller is connected to the isolation unit through a second serial port, and the second serial port is used to receive sampled data transmitted from the battery pack management units and/or control instructions through the isolation unit.

4. The battery pack management system of claim 3, wherein the controller is used to, in case of a single-point communication failure of the first daisy chain, configure the first serial port to send the control instructions to the battery pack management units through the isolation unit and to receive the sampled data transmitted from the battery pack management units through the isolation unit, and configure the second serial port to send the control instructions to the battery pack management units through the isolation unit and to receive the sampled data transmitted from the battery pack management units through the isolation unit.

5. The battery pack management system of claim 3, wherein:
the controller is used to, in case of a failure of the first serial port, turn off the first serial port and configure the second serial port to send the control instructions to the battery pack management units through the isolation unit and to receive the sampled data transmitted from the battery pack management units through the isolation unit; and
the controller is used to, in case of a failure of the second serial port, turn off the second serial port and configure the first serial port to send the control instructions to the battery pack management units through the isolation unit and to receive the sampled data transmitted from the battery pack management units through the isolation unit.

6. A control method of a battery pack management system, wherein the battery pack management system comprises a controller, an isolation unit, a plurality of battery pack management units, and a plurality of battery packs; the plurality of battery pack management units are connected in series by a first daisy chain, and the plurality of battery pack management units are also connected in series by a second daisy chain, each of the battery pack management units is used to manage a corresponding battery pack, the first daisy chain is used to transmit sampled data collected by the battery pack management unit from the corresponding battery pack and transmit control instructions of the controller, the second daisy chain is used to transmit a failure prompt signal which is generated by a battery pack management unit that detects a failure; the isolation unit comprises a first isolation unit and a second isolation unit a first battery pack management unit of the plurality of battery pack management units connected in series is connected to the controller through the first isolation unit, and a last battery pack management unit of the plurality of battery pack management units connected in series is connected to the controller through the second isolation unit each of the plurality of battery pack management units comprises a battery management chip; and communication pins of all battery management chips are connected to form the first daisy chain, and failure pins of all the battery management chips are connected to form the second daisy chain, wherein the control method comprises:

detecting, by the controller, whether the failure prompt signal transmitted through the second daisy chain is received; and determining, by the controller, that the battery pack management system fails when the failure prompt signal transmitted through the second daisy chain is received.

7. The control method of claim 6, wherein the controller is connected to the isolation unit through a first serial port, and the first serial port is used to send control instructions to the battery pack management units through the isolation unit, and receive sampled data transmitted from the battery pack management units through the isolation unit and the controller is connected to the isolation unit through a second serial port, and the second serial port is used to receive sampled data transmitted from the battery pack management units and/or control instructions through the isolation unit, wherein the control method further comprises: in case of a single-point communication failure of the first daisy chain, configuring, by the controller, the first serial port to send the control instructions to the battery pack management units through the isolation unit and to receive the sampled data transmitted from the battery pack management units through the isolation unit; and configuring, by the controller, the second serial port to send the control instructions to the battery pack management units through the isolation unit and to receive the sampled data transmitted from the battery pack management units through the isolation unit.

8. The control method of claim 6, wherein the controller is connected to the isolation unit through a first serial port, and the first serial port is used to send control instructions to the battery pack management units through the isolation unit, and receive sampled data transmitted from the battery pack management units through the isolation unit and the controller is connected to the isolation unit through a second serial port, and the second serial port is used to receive sampled data transmitted from the battery pack management units and/or control instructions through the isolation unit, wherein the control method further comprises:

in case of a failure of the first serial port, the controller turning off the first serial port and configuring the second serial port to send the control instructions to the battery pack management units through the isolation unit and receive the sampled data transmitted from the battery pack management units through the isolation unit; and in case of a failure of the second serial port, the controller turning off the second serial port and configuring the first serial port to send the control instructions to the battery pack management units through the isolation unit and receive the sampled data transmitted from the battery pack management units through the isolation unit.

\* \* \* \* \*